United States Patent
Auer et al.

(10) Patent No.: US 9,168,706 B2
(45) Date of Patent: Oct. 27, 2015

(54) JOINT ELEMENT MADE OF FIBER-REINFORCED PLASTIC AND PRODUCTION PROCESS AND USE THEREFOR

(75) Inventors: Thomas Auer, Metnitz (AT); Wolfgang Dietz, Pirching (AT); Christoph Krammer, Deuschlandsberg (AT); Andrea Pretzler, St. Katharein/Lmg (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 405 days.

(21) Appl. No.: 13/446,536

(22) Filed: Apr. 13, 2012

(65) Prior Publication Data

US 2012/0263521 A1   Oct. 18, 2012

Related U.S. Application Data

(60) Provisional application No. 61/475,370, filed on Apr. 14, 2011.

(30) Foreign Application Priority Data

Nov. 15, 2011   (EP) ..................................... 11189092

(51) Int. Cl.
*B62D 29/04* (2006.01)
*B29C 70/86* (2006.01)
(Continued)

(52) U.S. Cl.
CPC ................. *B29C 70/86* (2013.01); *B29C 53/76* (2013.01); *B62D 23/005* (2013.01); *B62D 29/04* (2013.01); *B29C 66/5244* (2013.01); *B29C 66/5245* (2013.01); *B29C 66/52451* (2013.01); *B29C 66/721* (2013.01); *B29L 2023/00* (2013.01); *B29L 2031/246* (2013.01); *F16B 7/044* (2013.01); *Y10T 403/443* (2015.01)

(58) Field of Classification Search
CPC ....................................................... B62D 29/04
USPC ................. 403/169, 170, 178, 172, 217, 218; 280/785; 296/29, 30
See application file for complete search history.

(56) References Cited

U.S. PATENT DOCUMENTS

| | | | | | |
|---|---|---|---|---|---|
| 5,213,391 | A | * | 5/1993 | Takagi | 296/205 |
| 5,806,919 | A | * | 9/1998 | Davies | 296/205 |

(Continued)

FOREIGN PATENT DOCUMENTS

| | | |
|---|---|---|
| CN | 86104976 B | 7/1988 |
| CN | 2035034 U | 3/1989 |

(Continued)

OTHER PUBLICATIONS

Neise, E., "Industrierobotereinsatz beim Wickelverfahren", ZWF—Zeitschrift Wirtschaftliche Fertigung, Jun. 1, 1986, vol. 81 No. 6, Carl Hanser Verlag GmbH & Co. KG, Munich, Germany.

(Continued)

*Primary Examiner* — Daniel Wiley
(74) *Attorney, Agent, or Firm* — Jordan IP Law, LLC; Todd A. Vaughn

(57) ABSTRACT

A joint element made of fiber-reinforced plastic having at least three tubular and/or profile-shaped connection regions. The joint element has at least one V-shaped or U-shaped rigid wall element, which is arranged between two connection regions and is connected to the fiber-reinforced plastic.

19 Claims, 4 Drawing Sheets

(51) Int. Cl.
    *B29C 53/76*     (2006.01)
    *B62D 23/00*     (2006.01)
    *B29L 31/24*     (2006.01)
    *B29L 23/00*     (2006.01)
    *F16B 7/04*     (2006.01)
    *B29C 65/00*     (2006.01)

(56) References Cited

U.S. PATENT DOCUMENTS

| | | | |
|---|---|---|---|
| 6,010,182 A * | 1/2000 | Townsend | 296/203.01 |
| 6,270,600 B1 * | 8/2001 | Wycech | 156/79 |
| 6,296,301 B1 * | 10/2001 | Schroeder et al. | 296/187.02 |
| 6,896,320 B2 * | 5/2005 | Kropfeld | 296/203.01 |
| 7,488,022 B2 * | 2/2009 | Belwafa et al. | 296/29 |
| 8,020,926 B2 * | 9/2011 | Enns | 296/193.12 |
| 8,235,421 B2 * | 8/2012 | Biscan | 280/781 |
| 2002/0050064 A1 * | 5/2002 | Furuse et al. | 29/897.2 |
| 2004/0105949 A1 | 6/2004 | Krause | |
| 2005/0050730 A1 * | 3/2005 | Marando et al. | 29/897.2 |
| 2006/0233598 A1 * | 10/2006 | Corrias et al. | 403/217 |
| 2007/0290495 A1 | 12/2007 | Biscan | |
| 2010/0259071 A1 | 10/2010 | Enns | |

FOREIGN PATENT DOCUMENTS

| | | |
|---|---|---|
| CN | 1134331 C | 6/2004 |
| CN | 1803435 A | 7/2006 |
| DE | 4423642 C1 | 10/1995 |
| GB | 668922 A * | 3/1952 |
| WO | 01/32496 A1 | 5/2001 |

OTHER PUBLICATIONS

Sanjeev Seereeram et al., "An All-Geodesic Algorithm for Filament Winding of a T-Shaped Form", IEEE Transactions on Industrial Electronics, Dec. 1, 1991, pp. 1-7, vol. 38 No. 6, IEEE, Piscataway, NJ, USA.

* cited by examiner

JOINT ELEMENT MADE OF FIBER-REINFORCED PLASTIC AND PRODUCTION PROCESS AND USE THEREFOR

CROSS-REFERENCE TO RELATED APPLICATIONS

The present application claims priority under 35 U.S.C. §119 to European Patent Application No. 11189092.7 (filed on Nov. 15, 2011), which claims priority to U.S. Provisional Patent Application No. 61/475,370 (filed on Apr. 14, 2011), which are each hereby incorporated by reference in their respective entireties.

FIELD OF THE INVENTION

The invention relates to a joint element made of fiber-reinforced plastic having at least three tubular and/or profile-shaped connection regions. The invention furthermore relates to a process for producing a joint element made of fiber-reinforced plastic having at least three tubular and/or profile-shaped connection regions. The invention also relates to the use of such a joint element.

BACKGROUND OF THE INVENTION

Joint elements are known in principle and are used, for example, in frame construction. By way of example, in this respect. DE 44 23 642 C1 discloses a carrier frame in a truss construction, in particular for a motor vehicle, which consists of separately prefabricated profiled frame parts and joints made of fiber composite material which connect the joints to one another in a dimensionally stable manner.

The joints are each produced from fiber preforms which are prefabricated in a mechanized manner and have a fiber structure which runs through three-dimensionally and holding pockets for the associated profiled frame parts. The fiber preforms are each individually compacted and consolidated to form an integral fiber composite joint structure, with profiled frame parts inserted into the holding pockets, in a molding tool which surrounds the joint region and fixes the profiled frame parts in their exact position. The known joint structure has the disadvantages that the production thereof is relatively complex and also the rigidity thereof is relatively low.

SUMMARY OF THE INVENTION

It is therefore an object of the invention to specify an enhanced joint element, an enhanced production process for a joint element and an advantageous use therefor. In particular, embodiments of the invention are provided to efficiently produce a relatively rigid joint element. The object of the invention is achieved by a joint element having at least one V-shaped or U-shaped rigid wall element, which is arranged between two connection regions and is connected to the fiber-reinforced plastic.

The object of the invention is furthermore achieved by a process for producing a joint element made of fiber-reinforced plastic having at least three tubular and/or profile-shaped connection regions, and which includes at least one of the following steps: a) arranging a wall element having a V-shaped or U-shaped cross-section on a positive core; b) winding a plurality of fibers around the wall element; and then c) curing the joint element after the introduction or application of a cross-linking plastic.

Embodiments of the invention overcomes the disadvantages of the prior art due to the V-shaped or U-shaped rigid wall element firstly significantly facilitating the production of the joint element and at the same time also drastically increasing the rigidity thereof.

Within the context of embodiments of the invention, a "joint element" is to be understood to mean any element which makes it possible to connect a plurality of bars or pipes, where the bars or pipes are each connected at the ends thereof. In particular, a joint element makes it possible to obtain an angularly rigid connection of said bars or pipes. In this case, the bars and pipes can have any desired cross section.

Within the context of the invention, a "tubular" connection region is to be understood to mean any connection region with a cross-sectional form in the case of which at least one inner region is enclosed by a closed border. In particular, the border may be oval or circular and also polygonal and rectangular. Forms other than those specifically mentioned, however, are unconditionally possible.

Within the context of the invention, a "profile-shaped" connection region is to be understood to mean any connection region with a cross-sectional form in the case of which there is no inner region enclosed by a closed border. In particular, this includes profiles, L profiles, U profiles and I profiles. Forms other than those specifically mentioned, however, are unconditionally possible.

For the sake of completeness, it is noted that a connection region can also include a mixed form of a tubular and a profile-shaped connection region. By way of example, two circular portions spaced apart from one another can be connected by a web, etc. The boundaries between a tubular and a profile-shaped connection region are additionally continuous, because a connection region can also include a slotted tubular region. Furthermore, it is noted that the tubular portions or profile-shaped portions do not necessarily have to have a constant wall thickness, but rather can also have a variable wall thickness.

Within the context of the invention, a "V-shaped or U-shaped" wall element is to be understood to mean wall elements which have a V shape or U shape or cross-section in the longitudinal extent thereof. In particular, this also includes those wall elements which reproduce a "V" or "U", in particular also V shapes with a plurality of kinks, U shapes with S-shaped and straight portions and also mixed shapes of a "U" and a "V". A wall element can have any desired cross section, but in particular also one which is matched to the cross section of the aforementioned bars or pipes, such that the inner shape of the connection region corresponds to the outer shape of the bars or pipes.

Advantageous configurations and developments of the invention become apparent from the dependent claims and also from the description, when considered together with the figures.

It is advantageous if the at least one wall element forms part of the inner wall of the joint element. The production of the joint element is thereby simplified considerably, since the wall element can be arranged directly on the positive core.

It is particularly advantageous if the fiber-reinforced plastic forms a triangular cover region and/or base region of the V-shaped or U-shaped wall element, it is thereby possible firstly for the rigidity of the joint element to be increased significantly and secondly, however, for the production thereof to also be simplified considerably, since the fibers cannot be wound over the individual legs of the joint element, but instead can be wound over two legs.

It is particularly advantageous, furthermore, if a foamed plastics body is arranged in the V-shaped or U-shaped section of the wall element. In this way, the rigidity of the joint element can be increased still further. In particular, the angular rigidity of the legs which adjoin this section in relation to one another is improved. Buckling of the aforementioned triangular cover region and/or base region can also be effectively avoided.

It is particularly advantageous in addition if the wall element has a comb-like or crenelated structure in a contact region with the fiber-reinforced plastic. In this way, the fibers are prevented from slipping on the positive core before the joint element is cured, as a result of which a reproducible quality can be achieved more effectively. It is preferable for the height of the tines or crenelations to correspond to the wall thickness of the fiber-reinforced plastic, such that the tines/crenelations do not protrude out of the finished joint element.

A beneficial configuration of the joint element comprises three connection regions and one wall element, since it is then very readily possible for fibers to be wound around the positive mold by, for example, winding fibers jointly around the two legs of the joint element which adjoin the wall element.

A further beneficial configuration of the joint element comprises four connection regions and two wall elements tying opposite one another, since it is then very readily possible for fibers to be wound around the positive mold by, for example, winding fibers jointly around the legs of the joint element which adjoin the wall elements.

It is beneficial if the wall element consists of metal, wood or already cured plastic. In this way, the properties of the wall element can be matched well to a requirement profile.

It is beneficial furthermore if the fiber-reinforced plastic contains glass fibers, Kevlar fibers, aramid fibers, carbon fibers, vegetable fibers, mineral fibers or mixtures of the same. The mechanical properties of the finished joint element can thus be controlled within wide limits.

It is beneficial in addition if the fiber-reinforced plastic contains fibrous strands, fibrous weaves, fibrous braids, fibrous knits and/or fibrous webs. In this way, the mechanical properties of the finished joint element can be controlled in various directions. The production of a closed surface is easier in particular with weaves, braids, knits and/or webs than with fibrous strands. In particular, it is also possible to use weaves, braids, knits and/or webs produced specifically for the joint element.

It is beneficial if step c) is effected in a negative mold. In this way, firstly the outer shape of the joint element can be fixed and secondly also the fiber-reinforced plastic can be compacted.

It is advantageous if the positive core is made up of one molded part for each connection region, which molded parts are pulled out of the connection regions along the longitudinal axis thereof after the joint element has been cured. In this way, the positive core can be removed easily from the finished joint element and therefore also reused. Alternatively, however, it is of course also conceivable for the positive core to be washed out, as a result of which it is also possible, in particular, to use single-part positive cores.

It is beneficial if the positive core is inflatable. This variant affords the advantage that the positive core can be reused.

It is particularly advantageous if a bar which remains in the joint element or a pipe which remains therein is provided for at least one connection region instead of the positive core. In this way, the joint element is equally permanently connected to said bar or said pipe after the curing. Separate measures for fastening the bar or pipe in the connection region of the joint element can therefore be omitted.

In this context, it is particularly advantageous if, in the initial step a), the watt element is connected in a form-fitting manner to the bar or the pipe. It is thereby possible to facilitate the production of the joint element and also to enhance the connection between the bar/pipe and the joint element. By way of example, the form-fitting connection can be established with the aid of tongues, depressions, pins and/or nails.

It is beneficial if the cross-linking plastic is introduced by impregnating the fibers with a liquid plastic. The cross-linking plastic can be introduced by impregnating the fibers applied to the positive core with a liquid plastic (e.g., epoxy resin or polyester resin), for example, by spraying on, rolling on or coating. As an alternative or in addition, the liquid plastic can also be injected into a closed negative mold.

It is beneficial furthermore if the joint element is heated for the purpose of curing. On the one hand, the curing is thus accelerated, and on the other hand the mechanical properties of the finished joint element can be influenced by the so-called "annealing," particularly when epoxy resin or polyester resin is used.

It is advantageous if the introduction of the cross-linking plastic in the step b) following the initial step is effected by using a fiber mixture containing thermoplastic fibers and the curing in step following the step b) is effected by heating the same. In this way, it is possible to avoid the introduction of a liquid plastic, as a result of which it is possible to produce the plastics component in a completely dry manner.

In an advantageous variant of the invention, the joint element is used for connecting a plurality of bars and/or pipes in frame construction, in particular owing to its high rigidity. Since the joint element is additionally also lightweight and generally rustproof, it additionally also satisfies the high demands in vehicle construction.

In a further advantageous variant of the invention, the joint element is finally used for connecting a plurality of pipes in a fluid conduit system, for the reasons which have already been mentioned above and since the joint element, despite its high rigidity, can have a hollow design.

The above configurations and developments of the invention can be combined in any desired way.

BRIEF DESCRIPTION OF THE DRAWINGS

Advantageous refinements of the invention will emerge from the dependent claims. An exemplary embodiment of the invention will be discussed in principle below on the basis of the drawing, in which:

DETAILED DESCRIPTION OF EMBODIMENTS

Figure 1:
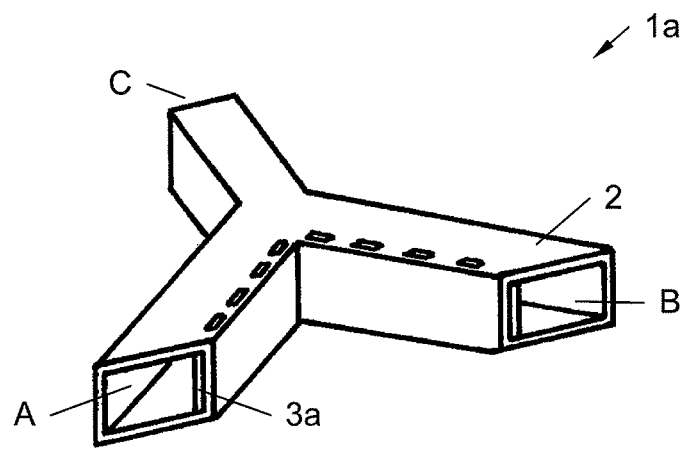
FIG. 1 illustrates a first embodiment of a joint element with a V-shaped wall element.

FIG. 1 illustrates a first embodiment of a joint element 1a made of fiber-reinforced plastic 2 having three tubular connection regions A, B and C. The joint element 1a includes a V-shaped rigid wall element 3a which is arranged between two connection regions A and B and is connected to the fiber-reinforced plastic 2. In this case, the wall element 3a forms part of the inner wall of the joint element 1a. The wall element 3a is preferably composed of metal, wood or precured plastic. Furthermore, the fiber-reinforced plastic 2 advantageously contains at least one of glass fibers, Kevlar fibers, aramid fibers, carbon fibers, vegetable fibers, mineral fibers or mixtures thereof, which are processed, for example, in the form of fibrous strands, fibrous weaves, fibrous braids, fibrous knits and/or fibrous webs.

Figure 2:
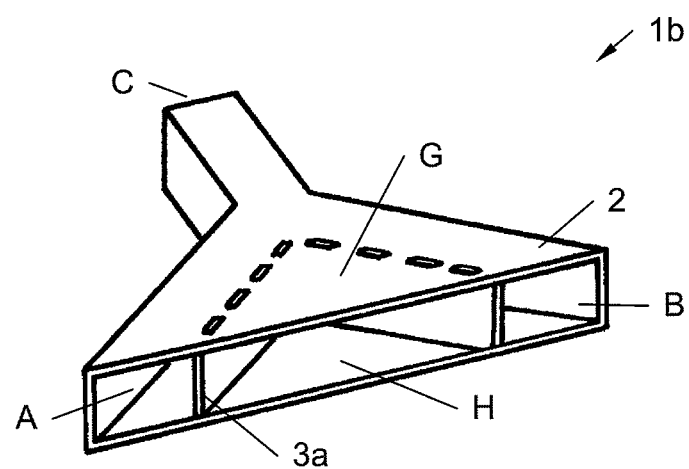
FIG. 2 illustrates a second embodiment of a joint element, in which the fiber-reinforced plastic is run over the cover region and the base region of the V-shaped wall element.

FIG. 2 illustrates a further embodiment of a joint element 1b, which is similar to the joint element 1a illustrates in FIG. 1. In contrast thereto, the fiber-reinforced plastic 2 forms a triangular cover region G and base region H at the V-shaped wall element 3a. The joint element 1b can, therefore, be produced so as to be particularly stable and particularly lightweight, since the fibers of the fiber-reinforced plastic 2 can be wound over the two connection regions A and B.

Figure 3:
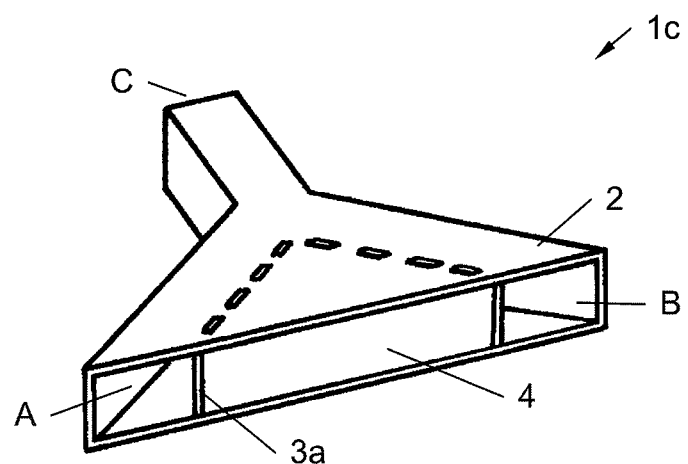
FIG. 3 illustrates a third embodiment of the joint element of FIG. 2, but with an additional, foam plastic body in the V-shaped section of the wall element.

FIG. 3 illustrates a joint element 1c having in further increased stability due to a foamed plastics body 4 arranged in a space defined by the cover region G and base region H at the V-shaped wall element 3a.

Figure 4:
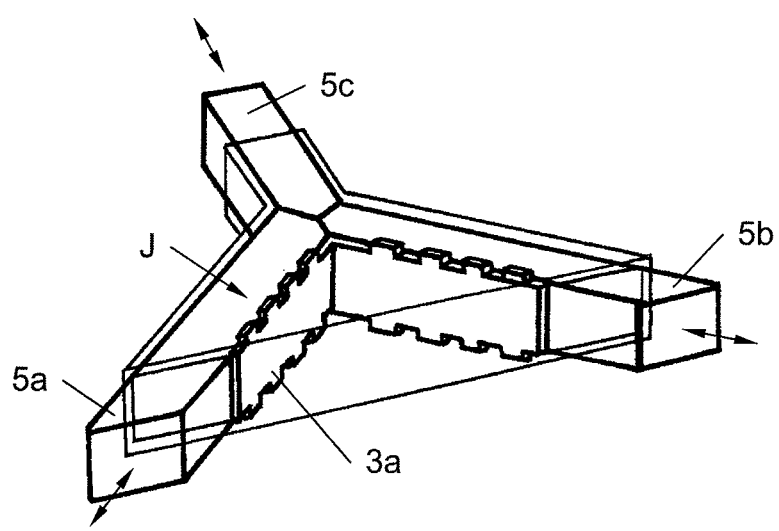
FIG. 4 illustrates a positive core with a wall element arranged thereon.

FIG. 4 illustrates a manner of producing a joint element 1a, 1b and 1c illustrated in FIGS. 1-3. In a first step, step a), the V-shaped wall element 3a is arranged on a positive core that includes sections 5a, 5b and 5c. In a second step, step b), a plurality of fibers are wound around the arrangement formed in the previous step a). Finally, the joint element 1a, 1b and 1c is cured following the introduction or application of a cross-linking plastic. In particular, step c) can be effected in a negative mold (not illustrated). It is advantageous for the joint element 1a, 1b and 1c to also be heated for the purpose of curing.

The cross-linking plastic can be introduced by impregnating the fibers with a liquid plastic (e.g., epoxy resin or polyester resin), for example, after step b), by spraying, rolling or coating said plastic onto the arrangement illustrated in FIG. 4 and around which fibers have been wound. In this context, it would also be conceivable, for example, for the positive core 5a, 5b and 5c illustrated to already be wetted with adhesive.

As an alternative or in addition, the liquid plastic can also be introduced by injection into a negative mold (not illustrated). Suitable plastics are in turn various resins and also, for example, thermoplastics.

In an advantageous variant of the invention, the cross-linking plastic is introduced in step b) using a fiber mixture containing thermoplastic fibers. The joint element 1a, 1b and 1c is then cured by heating the same, as a result of which the thermoplastic fibers melt and crosslink the temperature-stable fibers (e.g., glass fibers, Kevlar fibers, aramid fibers, carbon fibers, vegetable fibers or mixtures thereof).

In the present example, the positive core is made up of one molded part 5a, 5b and 5c for each connection region A, B and C. These molded parts 5a, 5b and 5c are mounted displaceably (symbolized b double-headed arrows) and are pulled out of the connection regions A, B and C along the longitudinal axis thereof after the joint element 1a, 1b and 1c has been cured. For the sake of greater clarity, the outlines of the finished joint element 1a, 1b and 1c are denoted by thin lines. As an alternative or in addition, the positive core 5a, 5b and 5c may be inflatable. In this case, it is not absolutely necessary to split the positive core 5a, 5b and 5c, since the inflatable positive core can be pulled out through one of the connection regions A, B and C.

It would also be conceivable for the positive core to have a separate central region which can remain in the joint element 1a, 1b and 1c following curing of the fiber-reinforced plastic 2. The positive cores 5a, 5b and 5c can then accordingly be shorter length. The central region of the joint element 1b and 1c thus obtained will advantageously become more stable.

It can also be seen clearly in FIG. 4 that the wall element 3a has a comb-like or crenelated structure J having a plurality of notches in a contact region with the fiber-reinforced plastic 2, such that the fibers do not slip so easily and the arrangement retains its shape better before and during the introduction of a liquid plastic. It is preferable for the height of the tines/crenelations to correspond to the wall thickness of the fiber-reinforced plastic, such that the tines/crenelations do not protrude out of the finished joint element 1a, 1b and 1c.

Figure 5:
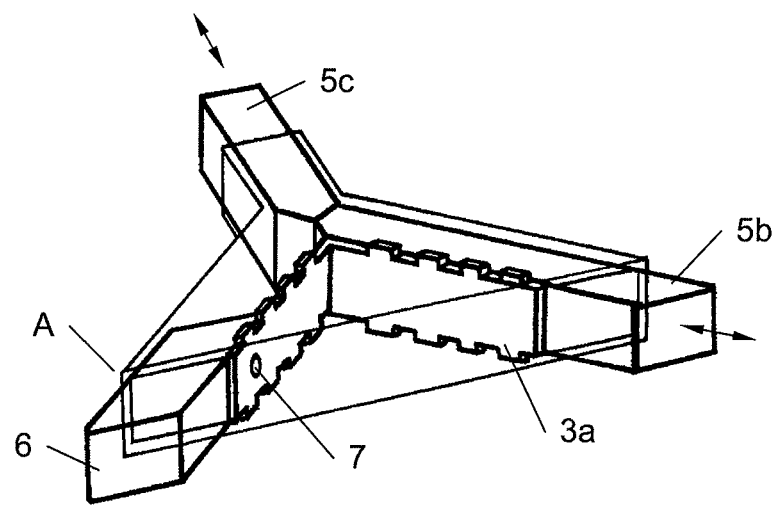
FIG. 5 illustrates a positive core with a wall element arranged thereon as in FIG. 4, but with a bar arranged in a connection region.

FIG. 5 illustrates a further process for producing a joint element 1a, 1b and 1c. In this case, a bar 6 (illustrated here in shortened form) which remains in the joint element 1a, 1b and 1c is provided for the connection region A instead of the positive core 5a. Alternatively, a pipe which remains therein can also be provided. The joint element 1a, 1b and 1c is advantageously equally permanently connected to the bar 6 after the curing. It goes without saying that a plurality of or even all of the connection regions A, B and C can also be equipped with such bars or pipes.

In order to facilitate the production of the joint element 1a, 1b and 1c, or also in order to enhance the connection between the bar 6 and the joint element 1a, 1b and 1c, in step a) the wall element 3a can be connected in a form-fitting manner to the bar 6 or the pipe, in particular by way of a pin 7 as illustrated here. It would also be conceivable, however, to establish a form-fitting connection with the aid of tongues, depressions and/or nails.

Figure 6:
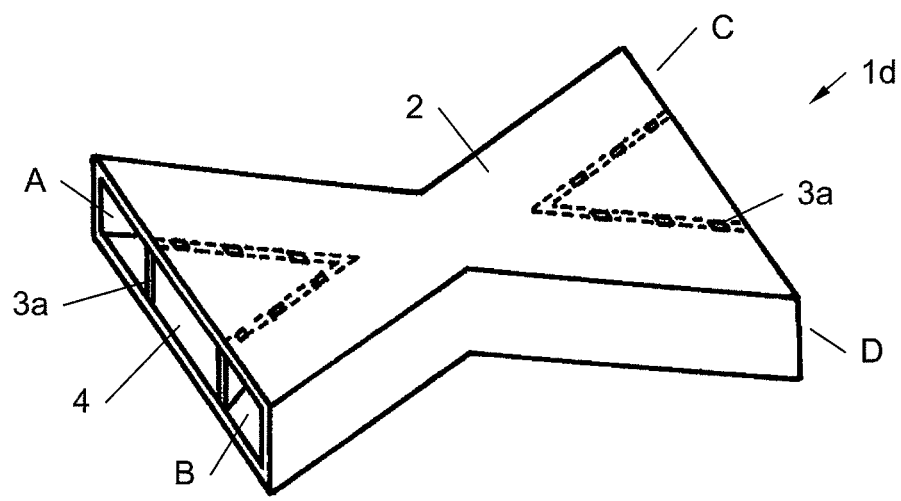
FIG. 6 illustrates a joint element with four connection regions and two wall elements.

FIG. 6 illustrates a further variant of a joint element 1d with four connection regions A, B, C and D and two wall elements 3a tying opposite one another. Otherwise, the joint element 1d has the same design as the joint element 1c illustrated in FIG. 4, and can also be produced in the same manner.

Figure 7:
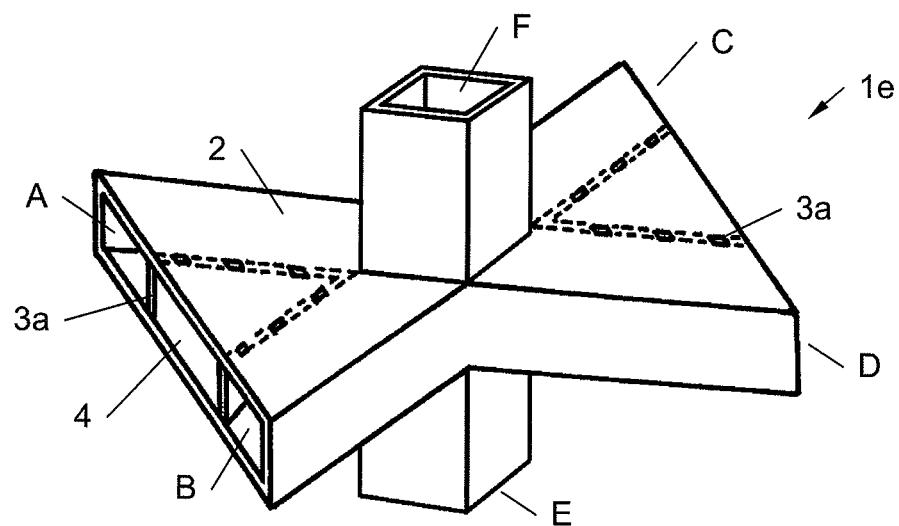
FIG. 7 illustrates a joint element with six connection regions in different planes.

FIG. 7 illustrates a variant of a joint element 1e which is similar to the joint element 1d illustrated in FIG. 6. In contrast thereto, however, the joint element 1e has two additional connection regions E and F. The connection regions A, B, C, D, E and F, therefore, do not have to lie in one plane.

Figure 8:
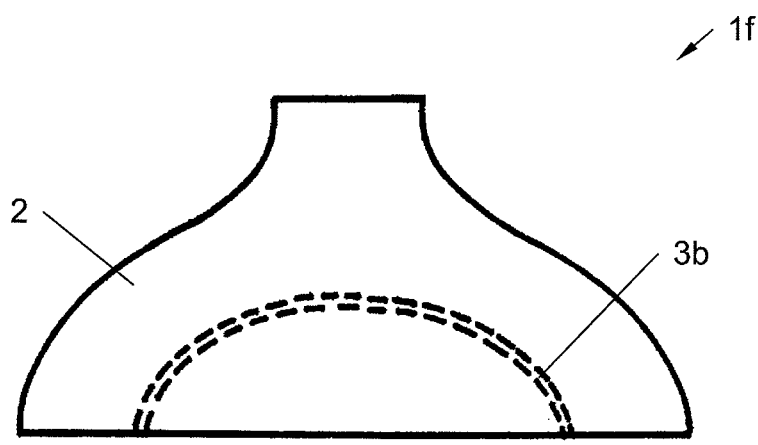
FIG. 8 illustrates a joint element with a U-shaped wall element.

FIG. 8 illustrates a variant of a joint element 1f having a U-shaped wall element 3b in plan view. In addition to the wall elements 3a and 3b illustrated, a "V-shaped or U-shaped" wall element is also to be understood to mean further shapes which reproduce a "V" or "U" cross-section, in particular also V shapes with a plurality of kinks, U shapes with S-shaped and straight portions and also mixed shapes of a "U" and a "V."

The wall elements 3a and 3b illustrated in the figures have a rectangular cross section, which is advantageous if rectangular pipes or bars are to be connected. It goes without saying that the wall elements 3a and 3b can also have another cross section, for example, a semicircular cross section, so that pipes or bars with a circular cross section can be connected. In addition, the wall elements 3a and 3b can also comprise a profile-shaped cross section (for example, having a U profile, an L profile, an I profile or a T profile) and also a mixed tubular/profile-shaped cross section.

The joint elements 1a, 1b, 1c, 1d, 1e and 1f can advantageously be used for connecting a plurality of bars and/or pipes in frame construction, in particular in motor vehicle construction. It would also be conceivable for the joint elements 1a, 1b, 1c, 1d, 1e and 1f to be used for connecting a plurality of pipes in a fluid conduit system.

Finally, it is noted that the component parts of the figures may not be shown to scale and that the individual variants shown in the figures can also form the subject matter of an independent invention. Positional statements such as "right", "left", "top", "bottom" and the like relate to the illustrated position of the respective component and must be adapted appropriately mentally if said position is changed. Furthermore, it is pointed out that the shapes of the joint elements 1a . . . 1f shown are of course purely exemplary and may not be used to limit the scope of protection of the patent claims. A person skilled in the art can readily apply the teaching disclosed here to any component form.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A joint element for connecting a plurality of bars or pipes, the joint element comprising:
   a plurality of tubular connection regions composed of a first material, each tubular connection region configured to receive one of the plurality of bars or pipes, the tubular connection regions including:
   a first tubular connection region,
   a second tubular connection region which combines with the first tubular connection region to form one of a V-shape and a U-shape, and
   a third tubular connection region extending from the one of the V-shape and a U-shape formed by the first tubular connection region and the second tubular connection region; and
   a wall element composed of a second material different than the first material and having one of a V-shape and a U-shape, which is connected to the first tubular connection region and the second tubular connection region between an inner wall of the first and second tubular connection regions and an outer surface of a respective bar or pipe within each of the first and second tubular connection regions.

2. The joint element of claim 1, wherein the first material comprises fiber-reinforced plastic and the second material comprises one of metal, wood and already cured plastic.

3. The joint element of claim 2, wherein the fiber-reinforced plastic contains at least one of glass fibers, Kevlar fibers, aramid fibers, carbon fibers, vegetable fibers, mineral fibers and combinations thereof.

4. The joint element of claim 2, wherein the fiber-reinforced plastic contains at least one of fibrous strands, fibrous weaves, fibrous braids, fibrous knits and fibrous webs.

5. The joint element of claim 1, wherein the wall element comprises a crenelated structure having crenelations to connect the wall element to the first tubular connection region and the second tubular connection region.

6. The joint element of claim 5, wherein a height of the crenelations corresponds to a wall thickness of the first tubular connection region and the second tubular connection region.

7. The joint element of claim 1, wherein the joint element is to connect one of a plurality of bars and a plurality of pipes in construction of a frame.

8. The joint element of claim 1, wherein the joint element is to connect a plurality of pipes in a fluid conduit system.

9. A joint element for connecting a plurality of bars or pipes, the joint element comprising:
   a plurality of tubular connection regions composed of a first material, each tubular connection region configured to receive one of the plurality of bars or pipes, the tubular connection regions including:
   a first connection region,
   a second connection region which combines with the first connection region to form one of a V-shape and a U-shape, and
   a third connection region extending from the one of the V-shape and a U-shape formed by the first connection region and the tubular connection region, and
   a wall element composed of a second material different than the first material and having one of a V-shape and a U-shape, which is connected to the first connection region and the second connection region between an inner wall of the first and second tubular connection regions and an outer surface of a respective bar or pipe within each of the first and second tubular connection regions;
   a cover region and a base region which define a space at the wall element; and
   a foam body arranged in the space.

10. The joint element of claim 9, wherein the first material comprises fiber-reinforced plastic and the second material comprises one of metal, wood and already cured plastic.

11. The joint element of claim 10, wherein the fiber-reinforced plastic contains at least one of glass fibers, Kevlar fibers, aramid fibers, carbon fibers, vegetable fibers, mineral fibers and combinations thereof.

12. The joint element of claim 10, wherein the fiber-reinforced plastic contains at least one of fibrous strands, fibrous weaves, fibrous braids, fibrous knits and fibrous webs.

13. The joint element of claim 9, wherein the wall element comprises a crenelated structure having crenelations to connect the wall element to the first tubular connection region and the second tubular connection region.

14. The joint element of claim 13, wherein a height of the crenelations corresponds to a wall thickness of the first tubular connection region and the second tubular connection region.

15. The joint element of claim 9, wherein the joint element is to connect one of a plurality of bars and a plurality of pipes in construction of a frame.

16. The joint element of claim 9, wherein the joint element is to connect a plurality of pipes in a fluid conduit system.

17. A joint element for connecting a plurality of bars or pipes, the joint element comprising:
   a plurality of tubular connection regions composed of a first material, each tubular connection region configured to receive one of the plurality of bars or pipes, the tubular connection regions including
   a first connection region and a second connection region which combines with the first connection region to form a first structure having one of a V-shape and a U-shape,
   a third connection region and a fourth connection region which combines with the third tubular connection region to form a second structure having one of a V-shape and a U-shape, wherein the first structure extends in an opposite direction than the second structure,
   a first wall element composed of a second material different than the first material and having a shape corresponding to that of the first structure, which is connected to the first connection region and the second connection region between an inner wall of the first and second tubular connection regions and an outer surface of a respective bar or pipe within each of the first and second tubular connection regions, and a second wall element composed of the second material and having a shape corresponding to that of the second structure, which is connected to the third connection region and the fourth connection region between an inner wall of the third and fourth tubular connection regions and an outer surface of a respective bar or pipe within each of the third and fourth tubular connection regions;

a first cover region and a first base region which define a first space at the first wall element and which receives a first foam body; and a second cover region and a second base region which define a second space at the second wall element and which receives a second foam body.

18. The joint element of claim 17, wherein the first material comprises fiber-reinforced plastic and the second material comprises one of metal, wood and already cured plastic.

19. The joint element of claim 17, wherein:
the first wall element comprises a crenelated structure having crenelations to connect the first wall element to the first connection region and the second connection region; and
the second wall element comprises a crenelated structure having crenelations to connect the second wall element to the third connection region and the fourth connection region.

* * * * *